G. F. VOIGHT.
SPRING SUSPENSION FOR VEHICLES.
APPLICATION FILED FEB. 26, 1919.
1,403,926.
Patented Jan. 17, 1922.
3 SHEETS—SHEET 1.
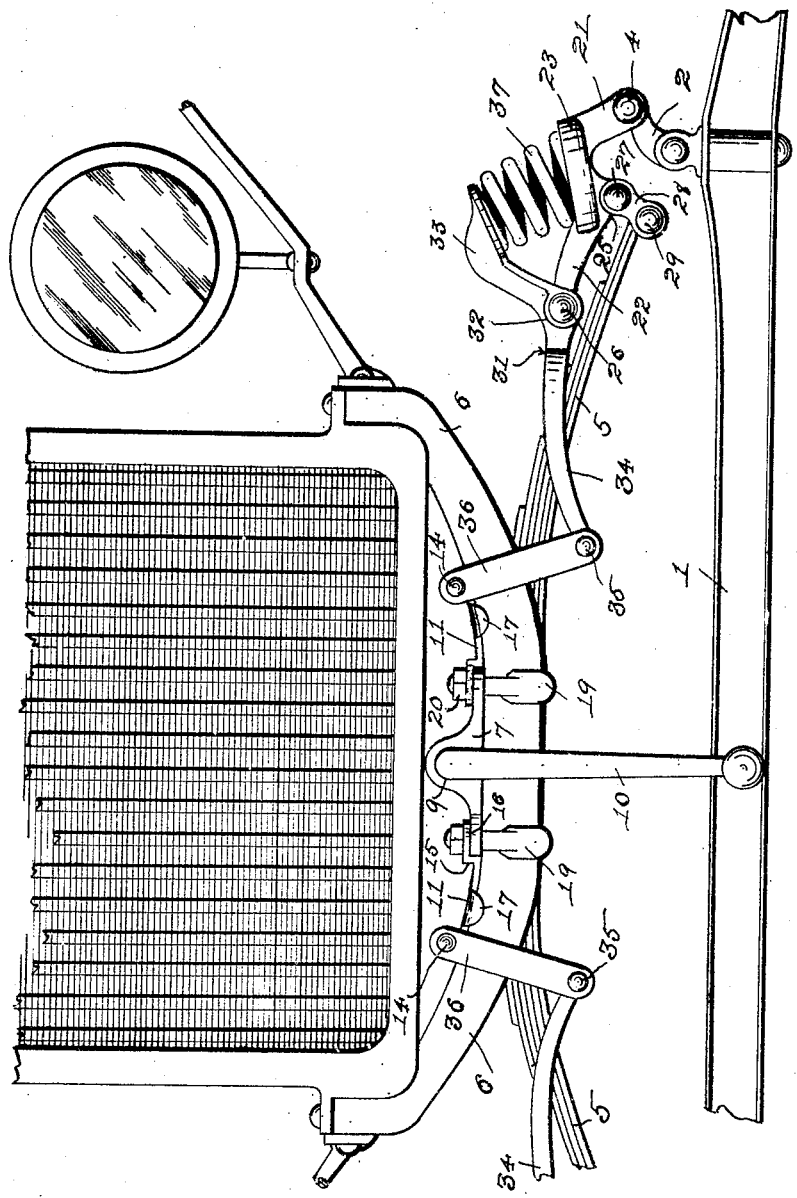
INVENTOR,
George F. Voight.

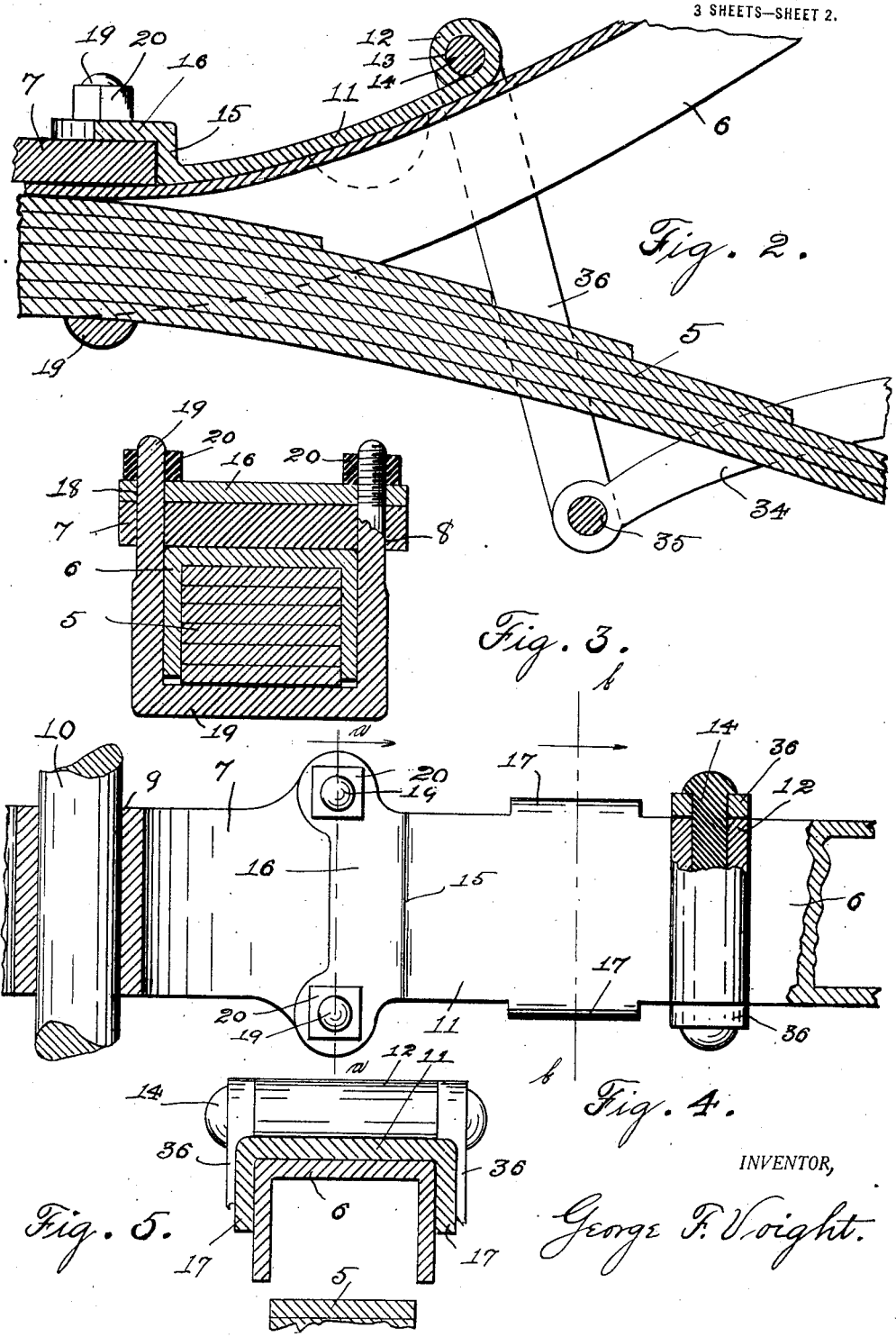

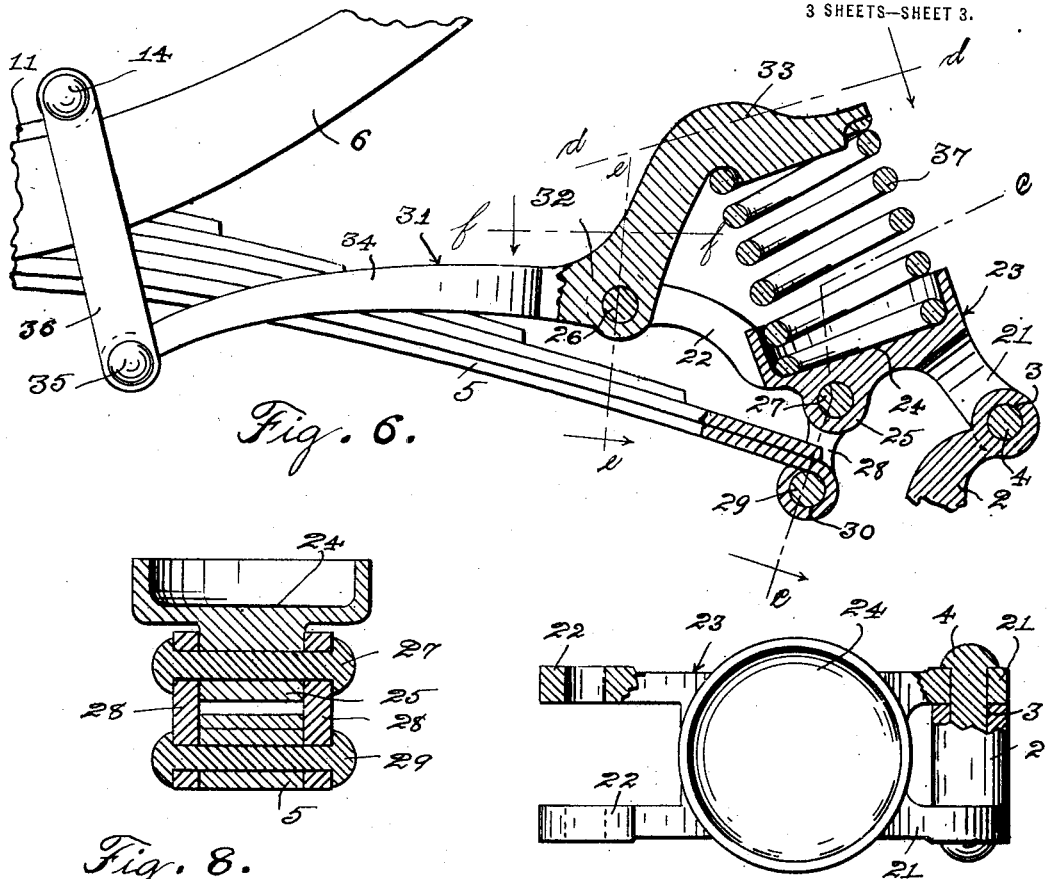

UNITED STATES PATENT OFFICE.

GEORGE F. VOIGHT, OF SAN FRANCISCO, CALIFORNIA, ASSIGNOR TO WALTER S. BURGESS, OF OAK PARK, ILLINOIS.

SPRING SUSPENSION FOR VEHICLES.

1,403,926.     Specification of Letters Patent.     Patented Jan. 17, 1922.

Application filed February 26, 1919. Serial No. 279,224.

*To all whom it may concern:*

Be it known that I, GEORGE F. VOIGHT, a citizen of the United States, and a resident of San Francisco, in the county of San Francisco and State of California, have invented new and useful Improvements in Spring Suspensions for Vehicles, of which the following is a specification.

My invention relates to vehicles in which upwardly bowed leaf springs of the semi-elliptical type are disposed above their axles and extend in general directions therewith, and in which shock absorbing devices of the cantilever type are interposed between the ends of said leaf springs and the axles.

An object of my invention is to provide means of the character mentioned, in which primary and secondary levers work in conjunction with auxiliary coil springs for assisting the leaf springs to cushion the vehicles against unevennesses of roads over which the vehicles may travel.

With the foregoing and other objects and purposes in view which will appear as the description proceeds, my invention resides in the combination and arrangement of parts and in the details of construction hereinafter described and claimed, it being understood that changes in the precise embodiment of the invention as herein disclosed can be made within the scope of what is claimed without departing from the spirit of the invention.

In the drawings:

Figure 1 is a portion of the front end of a vehicle with a unit of my invention applied to the left hand side thereof, and a portion of another unit thereof applied to the right hand side of the vehicle.

Figure 2 is a sectional elevation of a portion of one of the units, showing also portions of the vehicle.

Figure 3 is a sectional view on line *a—a*, Fig. 4.

Figure 4 is a plan view of a portion of the device with fragments of the vehicle showing, portions being shown in section.

Figure 5 is a sectional view on line *b—b*, Fig. 4.

Figure 6 is a view in elevation of a portion of one of the units of the present invention and portions of the vehicle, portions being shown in section.

Figure 7 is a top view of the primary lever, with portions thereof in section.

Figure 8 is a sectional view approximately on line *c—c*, Fig. 6.

Figure 9 is a top view of the secondary lever, with other parts also showing therein, showing a sectional cut through the lever approximately on line *f—f*, Fig. 6.

Figure 10 is a plan view of the outer end of the secondary lever, showing a sectional cut on line *d—d*, Fig. 6.

Figure 11 is a sectional view on line *e—e*, Fig. 6.

While I have shown in the drawings the invention as applied to the front end of a vehicle, it is to be understood that it is applicable to the rear end as well as to the front end of any vehicle.

To facilitate in describing the relative positions of the various parts and members and portions thereof, comprising the present invention, the term "inner end" or its synonyms, will designate the end or portion thereof nearest to the median vertical plane extending longitudinally through the vehicle, and the term "outer end" or its equivalents, will indicate the end or ends farthest from said plane.

Throughout the several views of the drawings, like numerals of reference indicate like parts.

1 designates the front axle of a vehicle, rigidly supporting upon its upper side a bracket 2, which is provided adjacent its upper end with a horizontally extending opening 3, in which is rotatably fitted a pivot pin 4.

5 is the vehicle's front leaf spring, upwardly bowed intermediate its ends and supporting upon said upwardly bowed portion the downwardly bowed intermediate portion of a channeled bed plate 6, which supports upon its upper side and intermediate its ends a cap 7 provided adjacent its outer ends with vertically extending openings 8 and intermediate its ends with a horizontally extending opening 9 for journaling the axle of the starting crank 10.

Upon the bed plate 6, intermediate its outer ends and the cap 7, are seated a pair of oppositely arranged saddle plates 11, each provided adjacent its outer end with a boss 12 having a transversely extending opening 13, in which is rotatably fitted a pivot pin 14, an off-set 15 engageable with one of the outer ends of the cap 7, an elevated inner portion 16 seated upon said end of the cap 7, and downwardly struck lips 17 intermediate its ends engageable with the sides of the bed plate 6 for restricting the transverse movements of said saddle plate relatively to the bed plate.

18 designates vertically extending openings in the portions 16, which register with the openings 8, and through which openings extend the threaded free ends of spring clips 19 adapted to clamp together the spring 5; bed plate 6, cap 7 and the inner ends of the saddle plates 11, and for which purpose the threaded ends of the clips are provided with nuts 20.

21 designates the arms forming the outer bifurcated end, and 22 the arms forming the inner bifurcated end, of a primary lever 23, provided upon its upper side and intermediate its ends with a spring seat 24, and upon its lower side with a boss 25. The free ends of the arms 21 engage the pivot pin 4, whereby the outer end of the lever may be pivotally supported by the bracket 3. The free ends of the arms 22 support the ends of a pivot pin 26, and the boss 25 pivotally supports the upper pin 27 of a spring shackle 28, which has a lower pin 29 extending through an eye 30 in one end of the leaf spring 5.

31 designates a secondary lever having an intermediate portion 32 disposed between the free ends of the arms 22 and pivotally supported by the pin 26, an outer portion 33 overhanging the primary lever 21, and an inner bifurcated portion forming a pair of arms 34 disposed one on each side of the leaf spring 5. The free ends of the arms 34 engaging a pivot pin 35, which is supported by the lower ends of a pair of links 36, which have their upper ends supported by the pivot pin 14 and are disposed one on each side of the bed plate 6 and free to move relatively thereto.

37 designates a coil compression spring confined between the portion 33 of the secondary lever and the spring seat 24 of the primary lever, and is adapted to normally yieldingly support the said portion 33, and normally indirectly yieldingly support the inner section of the primary lever and its boss 25 and by means of said boss and the spring shackle 28 to yieldingly support one end of the leaf spring 5.

I claim:

1. The combination with a vehicle having a bed plate supported by a leaf spring and a cap supported by said bed plate intermediate its ends, of a pair of longitudinally spaced apart saddle plates seated upon said bed plate, and offset over said caps, and a rigid connection between the offset ends of said saddle plates and cap.

2. The combination with a vehicle having a bed plate supported by a leaf spring and extending in a general direction therewith and a cap seated upon said bed plate intermediate the ends thereof, of a pair of longitudinally spaced apart saddle plates seated upon said bed plate, and a rigid connection between the inner ends of said saddle plates and said cap.

3. The combination with a vehicle having a bed plate supported by a leaf spring and extending in a general direction therewith and a cap seated upon said bed plate intermediate its ends, of a pair of saddle plates, one of said saddle plates being seated upon said bed plate intermediate one of its ends and said cap, the other of said saddle plates being seated upon said bed plate intermediate the other of its ends and said cap, the inner ends of said saddle plates being in engagement with said bed plate.

4. The combination with a vehicle having a bed plate supported by a leaf spring and extending in a general direction therewith and a cap carried by the bed plate between its ends, of a pair of saddle plates disposed upon said bed plate on opposite sides of said cap, and a connection between the inner ends of said saddle plates whereby they may be prevented from moving towards each other.

5. The combination with a vehicle having a bed plate supported by a leaf spring and extending in a general direction therewith and a cap carried by the bed plate intermediate its ends, of a pair of saddle plates seated upon said bed plate on opposite sides of said cap, and a rigid connection between the inner ends of said saddle plates.

6. The combination with a vehicle having a bed plate supported by a leaf spring and extending in a general direction therewith and a cap secured to the upper side of said bed plate intermediate its ends and nonmovable relatively thereto, of a pair of saddle plates, one of said saddle plates being seated upon said bed plate adjacent one end of said cap and the other of said saddle plates being seated upon said bed plate adjacent the other end of said cap, openings in the inner ends of said saddle plates, and means engaging said openings for rigidly securing said inner ends to said cap.

7. The combination with a vehicle having a bed plate supported by a leaf spring and extending in a general direction therewith, of a pair of spaced apart saddle plates carried by said bed plate, and means for connecting the inner ends of said saddle plates and bed plate together for preventing longitudinal movement of said saddle plates relatively to said bed plate.

8. The combination with a vehicle having a bed plate supported by a leaf spring and extending in a general direction therewith and a cap seated upon the bed plate intermediate its ends, of a pair of longitudinally spaced apart saddle plates seated upon said bed plate, and a pivot pin rotatably supported by the outer end of each of said saddle plates.

9. The combination with a vehicle having a bed plate supported by a leaf spring and extending in a general direction therewith, of a pair of longitudinally spaced apart saddle plates seated upon said bed plate, each of said saddle plates having an opening extending horizontally through its outer end, and a pivot pin rotatably fitted in each of said openings.

10. The combination with a vehicle having a bed plate supported by a leaf spring and extending in a general direction therewith and a cap rigidly secured to the upper side of said bed plate between the ends thereof, of a pair of saddle plates seated upon said bed plate on opposite sides of said cap and having their inner ends engageable therewith, an opening in each of said saddle plates adjacent its outer end, and a pivot pin extending through each of said openings and across the upper side of the bed plate.

11. The combination with a vehicle having a bed plate supported by a leaf spring and extending in a general direction therewith and a cap seated upon the upper side of said bed plate intermediate its ends and rigidly clamped thereto, of a pair of longitudinally spaced apart saddle plates seated upon said bed plate at opposite ends of said cap and having their inner ends engageable therewith, and means carried by said saddle plates engageable with the sides of said bed plate for restricting transverse movement of said saddle plates relatively to said bed plate.

12. The combination with a vehicle having a bed plate supported by a leaf spring and extending in a general direction therewith and a cap seated upon the bed plate intermediate the ends thereof and rigidly clamped thereto, of a pair of longitudinally spaced apart saddle plates seated upon said bed plate at opposite ends of said cap, and lips on the sides of said saddle plates engageable with the sides of said bed plate for restricting transverse movement of said saddle plates relatively to said bed plate.

13. The combination with a vehicle having a bed plate disposed above its leaf spring and extending in a general direction therewith and having an intermediate section seated thereon, and a cap and spring clips for rigidly clamping intermediate portions of said leaf spring and bed together, of a pair of saddle plates disposed one at each end of said cap and having portions seated upon said bed plate, means for securing the inner ends of said saddle plates to said cap, lips depending from the sides of said saddle plates intermediate the ends thereof engageable with the sides of said bed plate for restricting transverse movement of said saddle plates relatively to said bed plate, and a pivot pin extending across the upper side of said bed plate from one vertical side to the opposite vertical side thereof.

14. The combination with a vehicle having an axle and a leaf spring disposed above the axle and extending in a general direction therewith, of a rigid primary lever having its outer end pivotally connected to the axle, a secondary lever having its inner end supported by a portion of the vehicle subject to rebound, a pivotal connection between sections of said levers, a resilient connection between other portions of said levers laterally outside said pivotal connection, and a link connection between the primary lever and one end of said leaf spring.

15. The combination with a vehicle having a leaf spring disposed above its axle and extending in a general direction therewith, of a rigid primary lever having its outer end pivotally connected to said axle, a secondary lever having its inner end supported by a portion of the vehicle movable relatively to said axle, a pivotal connection between the inner end of said primary lever and said secondary lever, a resilient connection between the outer end of said secondary lever and the primary lever intermediate its ends, and a connection between said primary lever intermediate its ends and one end of said leaf spring.

16. The combination with a vehicle having an axle rigidly supporting a bracket upon its upper side and a leaf spring disposed above the axle and extending in a general direction therewith, of a primary lever having its outer end pivotally attached to said bracket, a secondary lever having its inner end supported by a portion of the vehicle movable relatively to said axle, a coil spring carried by said primary lever intermediate its ends, a pivotal connection between the inner end of said primary lever and the secondary lever intermediate its ends, a connection between the free end of said secondary lever and said coil spring, and a shackle connection between said primary lever and one end of said leaf spring.

17. The combination with a vehicle having an axle rigidly supporting a bracket and a leaf spring disposed above the axle and extending in a general direction therewith, of a rigid primary lever having its outer end pivotally supported by said bracket, a pivot pin secured to the inner end of said lever, a secondary lever having its inner end supported by a portion of the vehicle movable relatively to said axle, an intermediate portion of the secondary lever being pivotally attached to said pivot pin, a coil spring carried by said primary lever, a connection between the free end of said secondary lever and said spring, and a shackle connection between said primary lever and one end of said leaf spring.

18. The combination with a vehicle having an axle rigidly supporting a bracket and a leaf spring disposed above said axle and extending in a general direction therewith, of a rigid primary lever having its outer end pivotally attached to said bracket and its inner end attached to a pivot pin, a coil compression spring having its lower end seated upon said lever intermediate its ends, a secondary lever having its inner end supported by a portion of the vehicle subject to rebound, an intermediate section of said secondary lever being pivotally mounted on said pivot pin, an outer section of said secondary lever being resiliently supported by the upper end of said compression spring, and a shackle connection between said primary lever and one end of said leaf spring.

19. The combination with a vehicle having an axle rigidly supporting a bracket and having a leaf spring disposed above said axle and extending in a general direction therewith, a rigid primary lever arranged to have its outer end fulcrumed upon said bracket, a coil compression spring having its lower end seated upon said lever, a secondary lever, a support for its inner end, the outer end of said secondary lever being seated upon the upper end of said compression spring, a pivot pin connection between the inner end of said primary lever and the secondary lever intermediate its ends, and a pivotal connection between one end of said leaf spring and said primary lever intermediate its ends.

20. The combination with a vehicle having an axle rigidly supporting a bracket and having a leaf spring disposed above the axle and extending in a general direction therewith, of a rigid primary lever having an outer bifurcated end, the free end of the arms forming said bifurcated end being pivotally attached to said bracket adjacent its upper end, a coil compression spring having its lower end seated upon said lever, a secondary lever, a link connection between the inner end of said secondary lever and a portion of the vehicle, the outer end of said secondary lever being seated upon the upper end of said compression spring and yieldingly supported thereby, the inner end of said primary lever being pivotally attached to the secondary lever intermediate its ends, and a shackle connection between the primary lever and one end of said leaf spring.

21. In means of the character set forth, a rigid primary lever, a support for its outer end, a secondary lever, a relatively movable support for its inner end, means for pivotally supporting the inner end of the first named lever by the second named lever intermediate the ends of the latter, a resilient connection between the outer end of the second named lever and the first named lever intermediate the ends of the latter, and means for attaching one end of the vehicle's leaf spring to said first named lever.

GEORGE F. VOIGHT.